Sept. 15, 1970   YOJI MIYAMOTO   3,528,728
COVER OF A HINGE FOR SPECTACLES
Filed June 21, 1968

United States Patent Office 3,528,728
Patented Sept. 15, 1970

3,528,728
COVER OF A HINGE FOR SPECTACLES
Yoji Miyamoto, 20 4-chome, Nishiyamahondori,
Yaoshi, Japan
Filed June 21, 1968, Ser. No. 739,092
Claims priority, application Japan, June 26, 1967,
42/54,794
Int. Cl. E05d *11/00;* G02c *5/00*
U.S. Cl. 351—141                                    1 Claim

ABSTRACT OF THE DISCLOSURE

A hinge cover for spectacles comprised of a base plate and a semi-cylindrical portion, a part of the semi-cylindrical portion being cut so as to just receive the hinge when the cover is fixed but not to disturb its function.

BACKGROUND OF THE INVENTION

The present invention relates to a hinge cover for spectacles. More particularly, it relates to a cover for protecting the hinge which is mounted so that the temple will pivot within a predetermined angle at the end of a frame of the spectacles.

Usually, a spectacle hinge has a supporter hinge element and a receiver hinge element fixed respectively on the temple and the frame of the spectacles. They are allowed to engage pivotally with each other by aligning holes of protrusions or hinge knuckles which project from an end of both the supporter and the receiver respectively, a screw pin being received in the holes.

Since the hinge is fixed on the exposed surface of the frame and the temple, it detracts from the overall appearance of the spectacles. Moreover, since dust adheres to the screwed portion of the hinge, the temple is apt to stop the pivotal movement on the frame, or the screw pin can come loose and at last fall away.

It is therefore an object of the invention to overcome the disadvantages of conventional hinges for spectacles.

It is another object of the invention to provide a cover over the outer surface of a spectacle hinge without disturbing any function of the hinge.

SUMMARY OF THE INVENTION

A preferred embodiment of the invention will be further explained in connection with the attached drawing in which.

Figure 1:
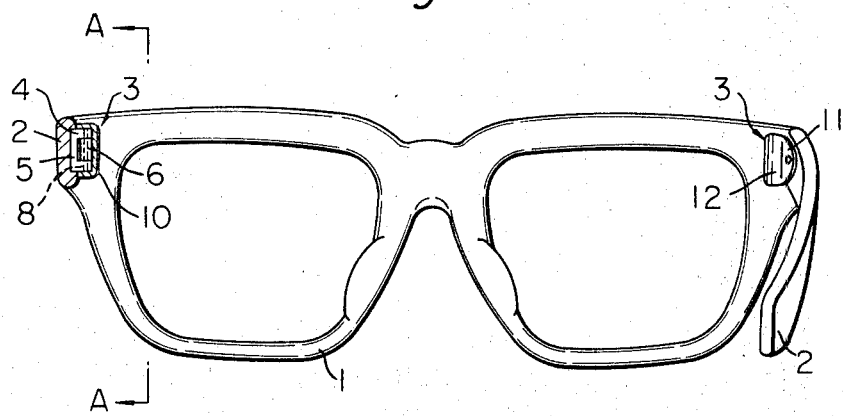
FIG. 1 is a rear elevational view partly in section of spectacles embodying a hinge cover according to the invention.
Figure 2:
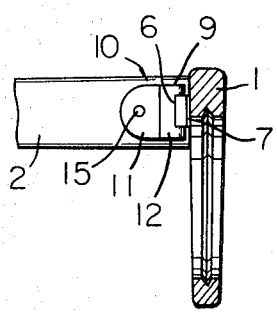
FIG. 2 is a cross-sectional view taken along the line A—A of FIG. 1.
Figure 3:
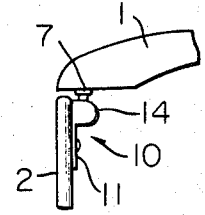
FIG. 3 is a top view of FIG. 2.
Figure 4:
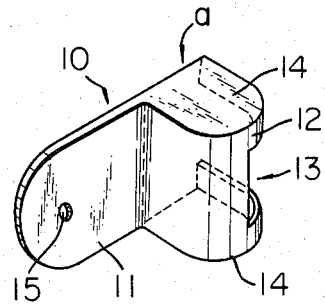
FIG. 4 is an enlarged perspective view of a hinge cover according to the invention.

FIG. 1 shows a frame of spectacles, the ends of which are connected pivotally to temples 2 by means of hinges 3. Each hinge 3 is comprised of a supporter hinge element 5 which is provided normally with two side protrusions or hinge knuckles 4, and a receiver hinge element 7 which is provided with insert or hinge knuckle 6 to be positioned between said protrusions 4. The supporter 5 and the receiver 7 are connected privotally at an interconnecting part 9 by inserting the inserts 6 of the receiver 7 between the protrusions 4 of the supporter 5, through which a screw pin 8 is passed from the top. Said supporter 5 is, in turn, set firmly by means of rivets or the like in substantially the same plane as the inner surface of the temple 2. The hinge cover 10 of the present invention is comprised of a base plate portion 11 and a side portion, the latter being a generally semi-cylindrical portion formed with a rear side opening *a*. Moreover, a part 13 of the side wall of the semi-cylindrical portion is slotted radially from an intermediate length to the opening *a* to provide a cut portion over an angle of about 90 degrees. The upper and lower ends of the semi-cylindrical portion 12 are provided with end walls 14. The cover 10 is set detachably by screws or the like through a hole 15 to the temple 2 in such a manner that the base plate 11 will cover the supporter 5 while the portion 12 will cover the connected hinge portion.

Since the base plate 11 of the hinge cover 10 is set closely on the upper surface of the supporter 5 of the hinge which, in turn, is fixed on the temple 2 and the semi-cylindrical wall 12 of the base plate 11 covers the hinge 3 through the opening *a*, the insert 6 of the receiver 7 of the hinge 3 which is fixed to the frame 1 is positioned correspondingly to the cut portion 13 of the semi-cylindrical portion 12. Since the portion is formed to extend over an angle of about 90 degrees, the temple 2 can move pivotally without any trouble.

In short, according to the present invention, the hinge cover has a side portion which is formed into a semi-cylindrical portion with the upper and lower ends closed and the base is fixed on the upper surface of a supporter of a hinge which, in turn, is fixed on a temple of spectacles. Moreover, the hinge which connects the frame and the temple of the spectacles is covered with the semi-cylindrical surface of said hinge cover and a portion of the semi-cylindrical surface is cut away radially over an angle of about 90 degrees. Since the insert of the receiver of the hinge which is fixed to the frame of the spectacles is positioned corresponding to the cut portion, the hinge can act without any trouble under adequately protected conditions. Thus, according to the invention dust cannot adhere to these parts and the hinge can pivot without any difficulty which would otherwise be caused by adherence of dust. Further, the upper and lower ends of the pin of the hinge are controlled with respect to its movement by the upper and lower covers on the semi-cylindrical portion of the cover. Thus the screw cannot fall out. The appearance of the spectacles is also greatly improved by providing the cover over the outer surface of the hinge.

As mentioned above, the present invention has been explained by way of the preferred embodiment illustrated in the attached drawing, but the invention should not be limited to that embodiment. Various changes and modifications can be made without departing from the spirit of the invention.

I claim:
1. In a spectacle
   a front frame, said front frame having a rear surface
   a temple, said temple having an inner surface, and
   hinge means pivotally connecting said temple with front frame, said hinge means including a first hinge element secured to the inner surface of said temple, a second hinge element secured to the rear surface of said front frame and interengageable with said first hinge element and screw pin means holding said hinge elements in interengaged relationship, the improvement of a hinge cover comprising:
      a relatively thin flat base plate, and
      a hollow relatively thin semi-cylindrical portion integral with said base plate at one side thereof, said semi-cylindrical portion being open at the rear thereof for receptively admitting said hinge means and closely covering the same when said base plate is secured to the inner surface of said temple, said semi-cylindrical portion further having a slotted part therein at the side remote from said base plate and extending from the open rear thereof for an angle of substantially 90 degrees to permit swinging movement of the temple with respect to the front frame, said semi-cylindrical portion further having upper and lower end walls retentively securing said pin means in said hinge elements.

References Cited

UNITED STATES PATENTS

| | | | |
|---|---|---|---|
| 3,156,757 | 11/1964 | Spina | 351—113 |
| 3,422,486 | 1/1969 | Thomas | 16—148 |

DAVID SCHONBERG, Primary Examiner

J. W. LEONARD, Assistant Examiner

U.S. Cl. X.R.

351—41, 153; 16—128, 148